(12) United States Patent
Haapala et al.

(10) Patent No.: US 7,496,372 B1
(45) Date of Patent: Feb. 24, 2009

(54) ACCESSING NUMBERS OUTSIDE A CLOSED USER GROUP IN A MOBILE COMMUNICATION SYSTEM

(75) Inventors: Soili Haapala, Espoo (FI); Lauri Lahtinen, Espoo (FI)

(73) Assignee: Nokia Corporation, Espoo (FI)

( * ) Notice: Subject to any disclaimer, the term of this patent is extended or adjusted under 35 U.S.C. 154(b) by 513 days.

(21) Appl. No.: 10/296,004

(22) PCT Filed: May 31, 2000

(86) PCT No.: PCT/EP00/05002
§ 371 (c)(1),
(2), (4) Date: Apr. 22, 2003

(87) PCT Pub. No.: WO01/93609
PCT Pub. Date: Dec. 6, 2001

(51) Int. Cl.
*H04B 7/00* (2006.01)
*H04Q 7/20* (2006.01)

(52) U.S. Cl. .................. 455/518; 455/519; 455/565

(58) Field of Classification Search ............... 455/413, 455/414.1, 414, 406, 426.1, 518, 519, 565; 379/211.02
See application file for complete search history.

(56) References Cited

U.S. PATENT DOCUMENTS

| | | | | |
|---|---|---|---|---|
| 5,512,885 A | * | 4/1996 | Agestam et al. | 340/825.52 |
| 5,987,520 A | * | 11/1999 | Libby et al. | 709/238 |
| 6,014,563 A | * | 1/2000 | Szabo | 455/435.1 |
| 6,542,733 B1 | * | 4/2003 | Dennis | 455/414.1 |
| 6,628,937 B1 | * | 9/2003 | Salin | 455/413 |
| 6,662,005 B1 | * | 12/2003 | Palvianen | 415/414.1 |

* cited by examiner

*Primary Examiner*—Nay A Maung
*Assistant Examiner*—Tuan H Nguyen
(74) *Attorney, Agent, or Firm*—Foley & Lardner LLP

(57) ABSTRACT

According to the present invention a method for implementing connection access authorization between a first entity and a second entity in a communication system comprising at least one closed user group is disclosed. The method comprises the steps of storing a table (DB3) of special identifications for an entity belonging to a closed user group, receiving a connection request, a) checking (12) whether the connection is within a closed user group, b) checking (13) whether all connections across the border of the closed user groups of both the first and the second entities are allowed, c) checking (14) whether the first entity belongs to the table (DB3) of special identifications for the second entity, and giving connection access (15) if at least one of the conditions a, b and c is true. By this method, a rejection of a connection request is overridden in case an entity having a special identification, e.g., a subscriber having a special number, is called. The invention also proposes a device for carrying out the method.

17 Claims, 4 Drawing Sheets

ACCESSING NUMBERS OUTSIDE A CLOSED USER GROUP IN A MOBILE COMMUNICATION SYSTEM

FIELD OF THE INVENTION

The present invention relates to mobile communication systems, and in particular to an implementation of outgoing access authorization in a mobile communication system comprising at least one closed user group of at least one subscriber.

BACKGROUND OF THE INVENTION

In addition to normal speech and data transmission, mobile communication systems provide a plurality of supplementary services for subscribers. Basic services according to the specifications have already been brought into use, and the number of more advanced services based on the intelligent network architecture increases continuously.

One supplementary service included in mobile communication systems is a closed user group (CUG). By means of the closed user group several different restrictions concerning the internal or external telecommunications can be defined for a selected group of subscribers. Available call restrictions include for example barring of incoming or outgoing calls and barring of long-distance or international calls. Closed user groups are typically applied in companies in which it is desirable to restrict the use of mobile stations given to employees mainly to professional purposes. In call set-up process closed user groups cause additional checks, on the basis of which call set-up either is continued normally or is discontinued due to call restrictions.

In closed user groups it is possible to allow some members of the closed user group to communicate with users outside the group by giving an outgoing access authorization to those members. Usually, such an outgoing access capability is provided only for a few members of the closed user group. The outgoing access capability is defined for each member or subscriber of the closed user group in a subscriber data base.

The WO 99/08468 defines a method of giving a call transfer possibility to some members of the closed user group. The basic idea of this patent application is to allow the transfer of a call to a specific number. The implementation of this feature has to be carried out for each subscriber in the corresponding subscriber data base.

However, in practice there is a need that all members or at least a group of the members of a closed user group can obtain outgoing access authorization for example with respect to numbers like numbers of authorities or some special service numbers outside the closed user group.

SUMMARY OF THE INVENTION

It is therefore an object of the present invention to facilitate handling outside numbers in a closed user group.

According to one aspect of the present invention, this object is achieved by a 1. A method for implementing connection access authorization between a first entity and a second entity in a communication system comprising at least one closed user group, the method comprising the steps of:
   storing a table of special identifications for an entity belonging to a closed user group;
   receiving a connection request;
   a) checking whether the connection is within a closed user group;
   b) checking whether all connections across the border of the closed user groups of both the first and the second entities are allowed;
   c) checking whether the first entity belongs to the table of special identifications for the second entity; and
   giving connection access if at least one of the conditions a, b and c is true.

According to another aspect of the present invention, this object is achieved by a connection authorization device for implementing connection access authorization between a first entity and a second entity in a communication system comprising at least one closed user group, the device comprising:
   a table of special identifications for an entity belonging to a closed user group;
   a first checking means for checking whether a requested connection is within a closed user group;
   a second checking means for checking whether all connections across the border of the closed user groups of both the first and the second entities are allowed;
   a third checking means for checking whether the first entity belongs to the table of special identifications for the second entity; and
   a connection establishment means which is adapted to give connection access if at least one of the first, second and third checking means output a positive result.

According to the present invention, the outgoing access capability of CUG groups are enhanced by creating an outgoing access capability for all or a group of members of a CUG group with respect to subscribers having special identifications special numbers listed in a separate table of special identifications for each CUG group.

That is, by the method and device, a rejection of a connection request is overridden in case an entity having a special identification, e.g., a subscriber having a special number, is called.

Moreover, according to the present invention, the check of special numbers or other criteria included in the separate routing table is done in one or more central network control elements and is done for all subscribers of the CUG group. Thus, in providing a general table instead of separate criteria per subscriber, numbers like authority numbers or service numbers which are allowed to all CUG members or to a group of them or other criteria common to all or to a group of the CUG members can be specified easily. To be precise, when a new number or an outgoing access criteria has to be added to all or to a group of CUG members, it has not to be defined for each subscriber in the corresponding data base. In providing a general table and check in the central network control element, implementation of common OA allowed numbers and criteria is facilitated.

When the invention is applied to a GSM system, the central network control elements mentioned above may be Mobile Switching Centers (MSC), and the separate routing table may be provided in the MSCs of the GSM system.

The table of special identifications may be managed independently of the other CUG information. Therefore, a change in the special identifications, e.g., the special numbers etc. can easily be performed.

Furthermore, the invention makes it possible to give more access rights to some subscribers in a CUG without a need to give them full outgoing access or the need to define a separate CUG. This enhances the flexibility of the CUG.

Further features and advantageous developments of the present invention are defined in the dependent claims.

In the following the present invention will be described by way of a preferred embodiment thereof with reference to the accompanying drawings.

DETAILED DESCRIPTION OF THE PREFERRED EMBODIMENT

In the following, the method according to the invention is described with respect to FIG. 1, in which a procedure for giving or rejecting a connection to a member of a closed user group is illustrated.

A closed user group CUG is a supplementary service which allows to group subscribers of a mobile communication system together and to define different restrictions for these groups by means of CUG parameters. A subscriber may belong to several closed user groups. In the GSM system, for example, the subscriber-specific maximum is ten. In the GSM system a closed user group is identified unequivocally by means of a CUG interlock code IC. Closed user groups are indicated to a subscriber with a so-called CUG index which is typically converted in the visitor location register VLR. The CUG index is a value assigned by the network to identify a CUG.

Group-specific definitions of the members of a closed subscriber or user group can be further specified by adding or removing restrictions. A CUG subscriber with incoming access IA can receive calls from outside the subscriber group. Correspondingly, a CUG subscriber with outgoing access OA can also make calls outside the group. Incoming calls barred ICB prevents a CUG subscriber from receiving calls from other members than of the same group. Correspondingly, a CUG subscriber with outgoing calls barred OCB can only call to other members of the same group.

Figure 1:
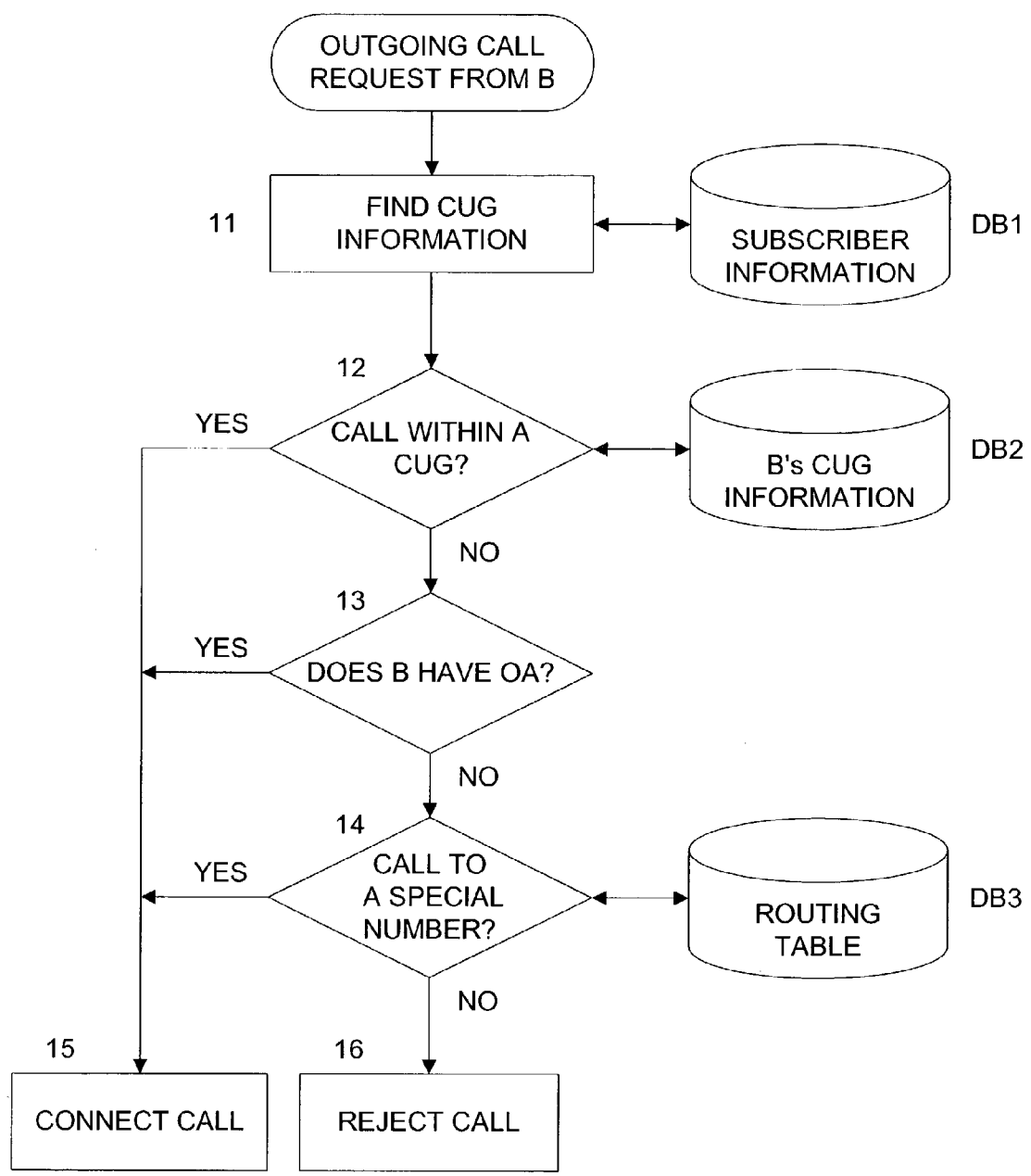
FIG. 1 is a flowchart illustrating a procedure for connecting or rejecting an outgoing call.

The procedure shown in the flowchart of FIG. 1 describes the procedure for on outgoing call according to the invention. In particular, it is assumed that a call to a subscriber A (as an example for a first entity) is requested by a subscriber B (as an example for a second entity) who is a member of the CUG.

The process illustrated in the flowchart is started in case a subscriber B requests an outgoing call. In step 11, the CUG information are extracted based on the subscriber information (which are denoted as a database DB1 in the figure). The subscriber may explicitly indicate the CUG (i.e., the CUG index) he wants to use when requesting the call. However, it is also possible that in the subscriber information DB1, a preferred CUG is stored which is used in case the subscriber does not indicate a CUG index. In particular, information regarding OA rights are obtained.

In step 12 it is checked whether the requested call is within a CUG, that is, whether the subscriber A to be called is also a member of the CUG. Therefore, it is referred to the information regarding the CUG of the calling subscriber B, which is denoted as a database DB2 in FIG. 1. In case the call is within the CUG, the procedure advances to step 15 in which the call is connected.

If, however, the call is not within the CUG, it is checked in step 13 whether the subscriber B has outgoing access OA, i.e., whether he is entitled to call outside the CUG. If he has OA, the procedure advances to step 15, and the call is connected.

If the subscriber B does not have OA, it is checked in step 14 whether the requested call is directed to a special number. For this check, it is referred to a table in which these special numbers are stored. This table is denoted as a routing table DB3 in FIG. 1. The table DB3 is called routing table since this table stores identification data which indicates that call of a member of a certain CUG is allowed to be routed outside the CUG although the particular member does not have OA.

The numbers stored in the routing table DB3 can be special numbers like numbers of authorities ore some special service numbers for which it might be useful that all members of the CUG can access them.

Preferably, the routing table DB3 is arranged in a central network control element. Thus, the table has to be provided only in a very few access points of the CUG in question.

If the check in step 14 results in that the call is directed to such a special number, the procedure advances to step 15, and the requested call is connected. If, however, the check in step 14 results in that the call is not directed to a special number, the procedure advances to step 16 in which the call is finally rejected.

Thus, by the procedure according to FIG. 1, it is not only checked whether a subscriber who is member of a CUG has outgoing access OA or not, but it is also checked whether he requests to call a special number which is allowed for all members, irrespective whether they have outgoing access OA or not. That is, the OA check is overridden in case such an allowed number is to be called.

Figure 2:
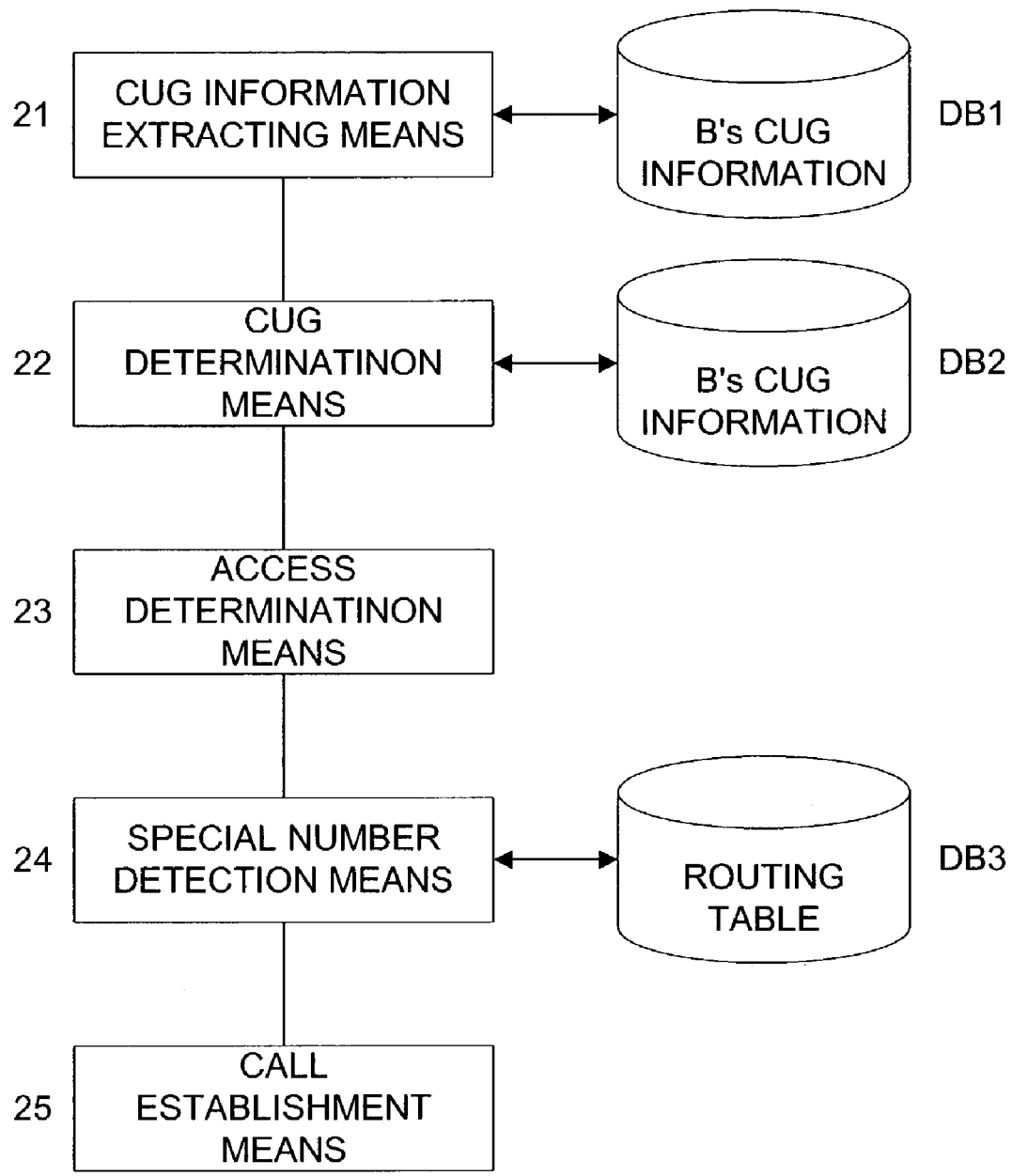
FIG. 2 is a block diagram of a device for performing the method according to FIG. 1.

FIG. 2 shows a device in which the procedure described above can be carried out.

Numeral 21 denotes a CUG information extracting means which accesses the database DB1 comprising subscriber information. In case a call request is received from a subscriber, the CUG information extracting means 21 obtains the corresponding CUG information from the database DB1, as described above with respect to FIG. 1.

Numeral 22 denotes a CUG determination means which accesses the database DB2 containing the information related to the CUG of the subscriber B. The CUG determination means 22 performs the process of step 12, i.e., checks whether the requested call is within the CUG in question.

Numeral 23 denotes an access determination means which performs the process according to step 13. That is, the access determination means 23 checks whether the subscriber B has outgoing access OA by referring to the corresponding CUG information.

Numeral 24 denotes a special number detection means which accesses the routing table DB3 containing the special numbers which are allowed to be called by the CUG members. The special number detection means performs the process of step 14.

Numeral 25 denotes a call establishment means by which a call is connected in case one of the means 22 to 24 output a positive result. In case none of the means 22 to 24 output a positive result, the call is rejected. Hence, the call establishment means 25 performs the process of step 15.

In the following, a procedure for incoming call is described with respect to the flowchart shown in FIG. 3. Here, it is assumed that a call from a subscriber A (as an example for a first entity) to a subscriber B (as an example for a second entity) who is a member of the CUG is coming in.

In step 31, the CUG information are extracted based on the subscriber information of the called subscriber B (which are denoted as the database DB1 in the figure). In particular, information regarding OA rights are obtained, as in the procedure of FIG. 1.

In step 32 it is checked whether the requested call is within a CUG. That is, it is checked whether the caller, i.e., subscriber A, is a member of the CUG of the called subscriber B. Therefore, it is referred to the information regarding the CUG of the subscriber B, which is denoted as a database DB2 in FIG. 3. In case the call is within the CUG, the procedure advances to step 35 in which the call is connected.

If, however, the call is not within the CUG, it is checked in step 33 whether the subscriber B has incoming access IA, i.e., whether he is entitled to receive calls from outside the CUG. If he has IA, the procedure advances to step 35, and the call is connected.

If the subscriber B does not have IA, it is checked in step 34 whether the requested call is originated from a subscriber having a special number. For this check, it is referred to the routing table DB3 described above with respect to FIG. 1.

If the check in step 34 results in that the call is originated from a subscriber having a special number included in the routing table DB3, the procedure advances to step 35, and the requested call is connected. If, however, the check in step 34 results in that the call is not originated from a subscriber having a special number, the procedure advances to step 36 in which the call is finally rejected.

The procedure described above with respect to FIG. 3 can also be carried out by the device shown in FIG. 2. In this case, the access determination means 23 is adapted to check incoming access IA instead outgoing access OA.

In the following the invention will be described by using the functions and structure of the GSM mobile communication system (Global System for Mobile Communications, GSM) as a practical example, but the invention can also be applied to other similar radio systems which support the facilities related to closed user groups.

Figure 4:
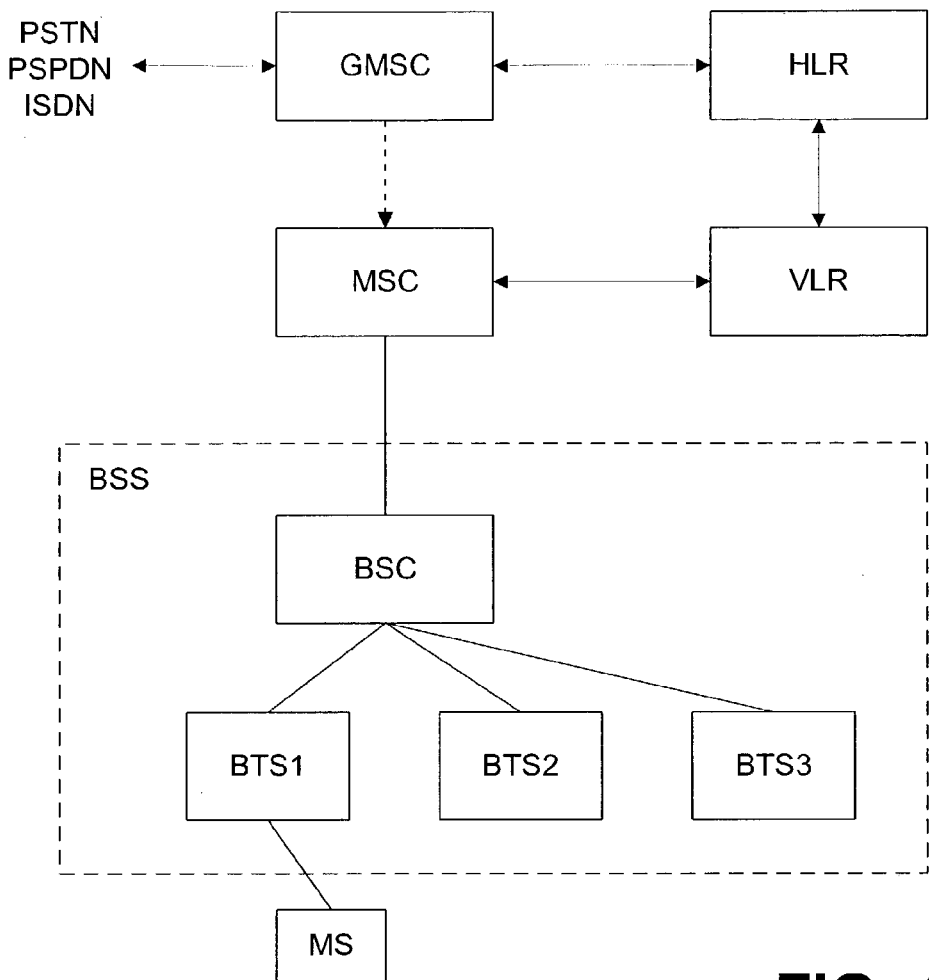
FIG. 4 is a block diagram illustrating basic components of the GSM system in which the procedures according to FIGS. 1 and 3 are applied.

FIG. 4 illustrates the basic components of the GSM system. A mobile services switching center MSC is responsible for switching incoming and outgoing calls. It performs tasks of the same type as the center of the public switched telephone network (PSTN). In addition to these tasks, it carries out functions typical of mobile telephone traffic only, such as management of subscriber location, together with the subscriber registers of a network. In the GSM system a home location register HLR and a visitor location register VLR function as the subscriber registers, i.e., as the subscriber information database DB1 described above. Subscriber data and information on the VLR within which a mobile station MS is located are stored permanently in the home location register HLR. The visitor location register VLR in turn stores subscriber data of the mobile station MS temporarily for the period in which the mobile station stays in the area of the mobile services switching center related to the visitor location register VLR.

Mobile stations MS connect to the switching center MSC by means of base station systems BSS. A base station system BSS comprises base station controllers BSC and base transceiver stations BTS. One base station controller BSC is used for controlling several base transceiver stations BTS.

Figure 5:
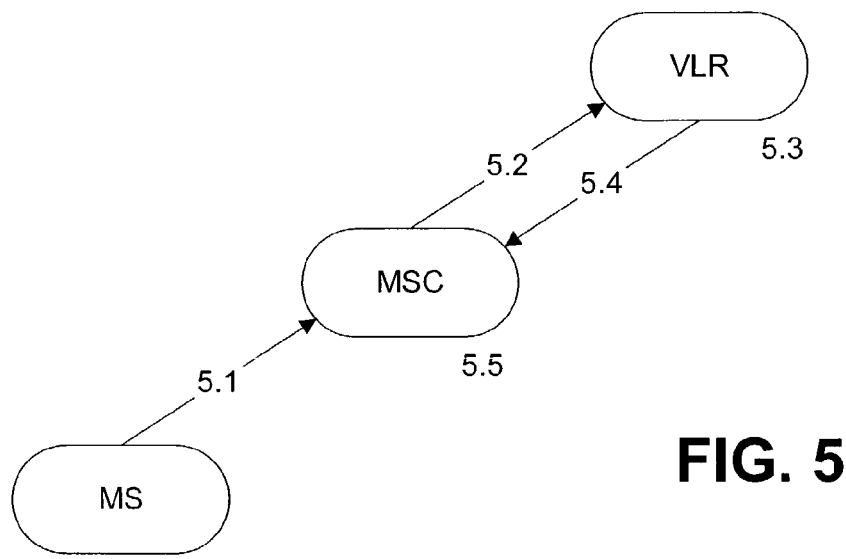
FIG. 5 is a block diagram and signaling diagram illustrating a communication between a subscriber and a switching center in the GSM system of FIG. 4.

FIG. 5 illustrates a communication between a subscriber or mobile station MS and the switching center MSC of the GSM system of FIG. 4, which communication serves to establish a call set-up between the mobile station MS and another subscriber in case the subscriber requests an outgoing call. That is, FIG. 5 illustrates the same situation as FIG. 1.

In step 5.1 the mobile station MS sends a request for call set-up to the switching center MSC under the control of which the subscriber is at the moment of transmission. The subscriber can explicitly define the CUG group that is to be used in connection with, the call by giving the CUG index from the mobile station.

The switching center MSC sends a subscriber data interrogation to the visitor location register VLR functioning in connection with it (step 5.2). The interrogation also includes possible CUG information sent in the request for call set-up. If the subscriber has not explicitly given a CUG index, it is checked in the visitor location register VLR whether the subscriber data include the preferred CUG related to the basic service indicated in the request for call set-up. If the preferred CUG has been defined the closed subscriber group will be determined according to that. If the call set-up message does not include CUG information and no preferred CUG has been defined, the call in question is a normal call.

A CUG check is conducted in the visitor location register VLR (step 5.3). During the check a decision is made on the basis of the information given by the subscriber, subscriber data updated in the visitor location register and an MO (Mobile Originated) CUG check function whether the subscriber is entitled to the requested call set-up. In particular, in step 5.3 the checks as described above with respect to steps 12 to 14 of FIG. 1 are conducted.

In detail, during the check as mentioned above with respect to step 12 in FIG. 1, a possible CUG index is converted into a CUG interlock code, on the basis of which a mobile communication network identifies the CUG group for which the call is intended. If the CUG group for which the call is intended is the same as that of the calling subscriber, the call is connected, that is, the MSC allows the call (see step 15 in FIG. 1). If no CUG information is expressed either explicitly or implicitly, the call request is further checked with respect to the OA rights of the subscriber (step 13). If the call is allowed on the basis of the CUG check and CUG information is expressed, the call is established as an MO CUG call. In that case, the VLR sends the CUG information back to switching center MSC (step 2.4) so that the call set-up can continue. If the call is not allowed on the basis of the CUG check, the visitor location register VLR informs the switching center MSC that the call has been rejected (which corresponds to NO in step 13 of FIG. 1).

According to the present invention, a separate routing table (DB3 in FIG. 1) is provided in the MSC for each CUG group, respectively. This separate routing table contains special numbers which all or a group of the CUG members can access.

Thus, according to the present invention, when the MSC is informed by the VLR that the call has been rejected since the subscriber does not have outgoing access OA, in step 5.5 it performs an additional check as to whether the number dialed by the subscriber, i.e. the number for which the call set-up is to be established, belongs to the special numbers included in the separate routing table for the CUG group of the subscriber. Thus, this process corresponds to step 14 in FIG. 1.

In addition, in this embodiment the MSC further checks whether the subscriber belongs to the group of CUG members being allowed to access the special numbers. That is, in addition to the procedure illustrated in FIG. 1, in this example the special numbers stored in the routing table DB3 are not allowed for all members of the CUG but only for a part of them. The corresponding checks can be done on the basis of the above-mentioned CUG information of the subscriber which is supplied by the VLR.

In case the MSC detects that the dialed number is included in the separate routing table and that the subscriber belongs to the allowed CUG member group, it overrides the call rejection issued by the VLR and continues the call set-up.

In case the dialed number is not included in the separate routing table DB3 of the MSC, or the dialed number is included in the separate routing table DB3 but the subscriber does not belong to the allowed CUG member group, the MSC rejects the call and informs the MS about the discontinuation of the requested call set-up (as in step 16 of FIG. 1).

According to the present invention, the outgoing access capability of CUG groups are enhanced by creating an outgoing access capability for all or a group of members of a CUG group with respect to special numbers listed in a separate routing table for each CUG group, the separate routing tables being provided in the MSCs of the GSM system.

The separate routing table for a CUG group contains route specific data, i.e. specific numbers, and indicates whether a CUG call is allowed to the requested route.

In the separate routing table, besides the special numbers, additional or alternative identifications can be included, for example the time at which the subscriber requests the call set-up or the current location of the subscriber, the additional identifications or criteria being common to all or to a group of the CUG members. When the MSC receives a call set-up request from a subscriber, also these criteria are checked in the separate routing table as to whether the call set-up can be allowed.

According to the present invention, the check of special numbers or other criteria included in the separate routing table is done in the MSC and is done for all subscribers of the CUG group. Thus, in providing a general table instead of separate criteria per subscriber, numbers like authority numbers or service numbers which are allowed to all CUG members or to a group of them or other criteria common to all or to a group of the CUG members can be specified easily. To be precise, when a new number or an outgoing access criteria has to be added to all or to a group of CUG members, it has not to be defined for each subscriber in the corresponding data base. In providing a general table and check in MSC, implementation of common OA allowed numbers and criteria is facilitated.

The routing table may be managed independently of the other CUG information. Therefore, a change in the special numbers etc. can easily be performed.

Furthermore, the invention gives the possibility to give more access rights to some subscribers in a CUG without a need to give them full outgoing access or the need to define a separate CUG. This enhances the flexibility of the CUG.

While the invention has been described with reference to a preferred embodiment, the description is illustrative of the invention and is not to be construed as limiting the invention. Various modifications and applications may occur to those skilled in the art without departing from the true spirit and scope of the invention as defined by the appended claims.

Figure 3:
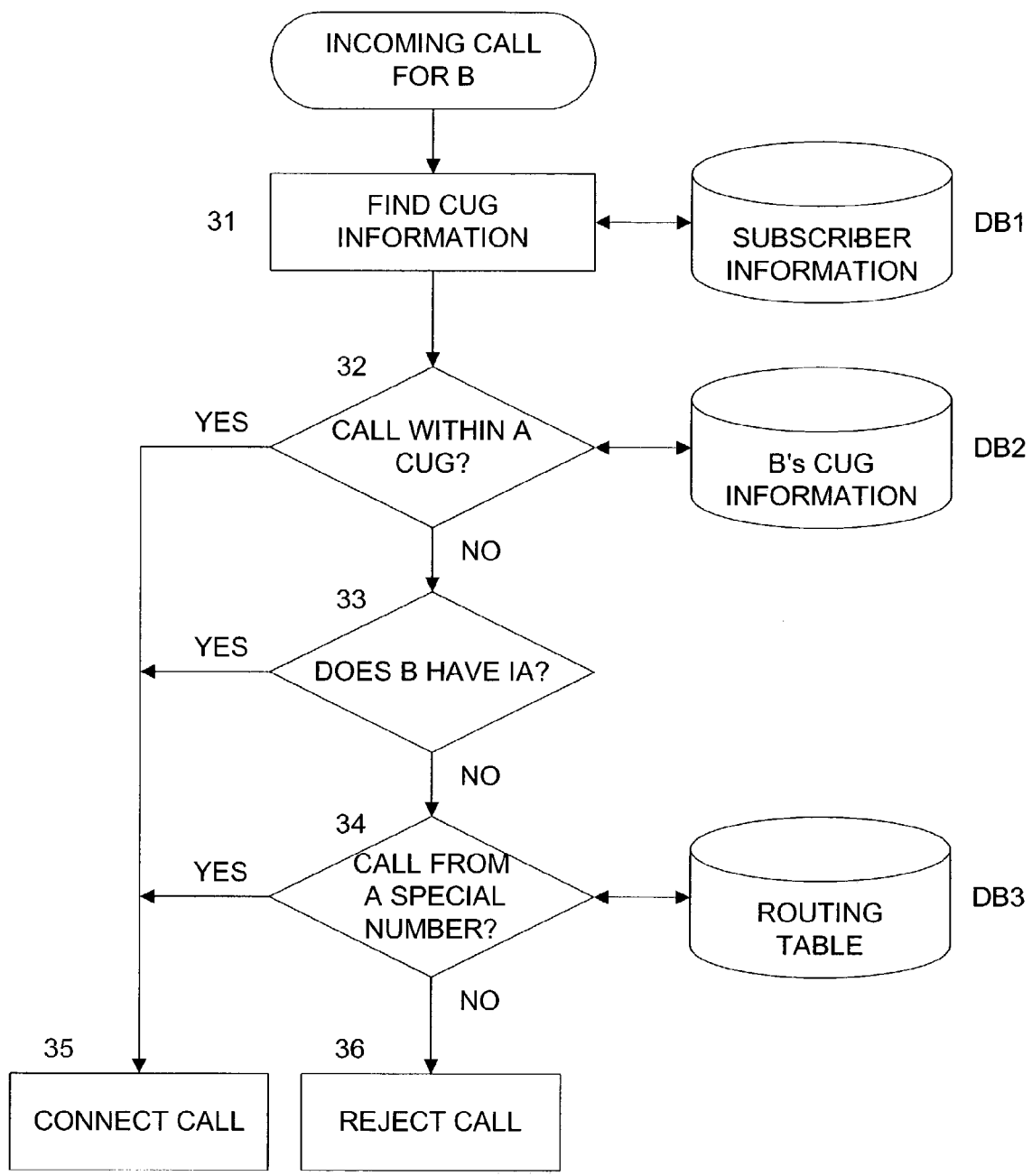
FIG. 3 is a flowchart illustrating a procedure for connecting or rejecting an incoming call.

For example, the order of steps 12 to 14 in the procedure of FIG. 1 and the order of steps 32 to 34 in the procedure of FIG. 3 is not fixed. That is, step 14 in which it is referred to the routing table DB3 can be performed first, before steps 12 and 13. Hence, the steps can be performed in an arbitrary order.

Furthermore, in the above examples a telephone call is checked. However, it is to be understood that other kind of connections can be checked as well. For example, data communications of the mobile stations MS as member of a certain CUG to the Internet can be restricted. In particular in this case it might be useful to allow a restricted number of members of the CUG to access the Internet via their mobile stations but to give them no outgoing access OA. Thus, these members are allowed to transmit e-mails or the like, but are not allowed to conduct telephone calls to the outside.

The invention claimed is:

1. A method comprising:
    storing a table of special identifications, wherein the table of special identifications is valid for a group of subscribers in a closed user group of a communication system, the closed user group comprising a plurality of subscribers, the special identifications corresponding to entities outside the closed user group with whom connection access is allowed;
    receiving a request for a connection between a first entity and a second entity, the first entity being one of the group of subscribers of the closed user group;
    a) checking whether the connection is within the closed user group;
    b) checking whether the connection is allowed if it crosses the border of the closed user group;
    c) checking whether the second entity corresponds to the table of special identifications listing entities outside the closed user group with whom connection access is allowed; and
    giving connection access if at least one of the conditions a, b and c is true; and
    rejecting connection access if each of conditions a, b and c is false.

2. The method according to claim 1, wherein the connection access is an outgoing access.

3. The method according to claim 1, wherein the connection access is an incoming access.

4. The method according to claim 1, wherein the table of special identifications is valid for all subscribers of the closed user group.

5. The method according to claim 1, wherein the identifications stored in the table of special identifications comprise special numbers.

6. The method according to claim 1, wherein the identifications stored in the table of special identifications comprise time of the received connection request.

7. The method according to claim 1, wherein the identifications stored in the table of special identifications comprise the location of the subscriber when requesting a connection.

8. An apparatus, comprising:
    a table of special identifications, wherein the table of special identifications is valid for a group of subscribers of a closed user group in a communication system, the closed user group comprising a plurality of subscribers, the special identifications corresponding to entities outside the closed user group with whom connection access is allowed;
    a first controller configured to check whether a requested connection between a first entity and a second entity is within the closed user group, the first entity being one of the group of subscribers of the closed user group;
    a second controller configured to check whether the connection is allowed, if it crosses the border of the closed user group;
    a third controller configured to check whether the second entity belongs to the table of special identifications listing entities outside the closed user group with whom connection access is allowed; and
    a connection controller configured to give connection access to the first entity and the second entity, if at least one of the first, second and third controller output is a positive result, and to reject connection access if each of the first, second and third controller output is a negative result.

9. The apparatus according to claim 8, wherein the connection access is an outgoing access.

10. The apparatus according to claim 8, wherein the connection access is an incoming access.

11. The apparatus according to claim 8, wherein the table of special identifications is valid for all subscribers of the closed user group.

12. The apparatus according to claim 8, wherein the identifications stored in the table of special identifications comprise special numbers.

13. The apparatus according to claim 8, wherein the identifications stored in the table of special identifications comprise time of the received connection request.

14. The apparatus according to claim 8, wherein the identifications stored in the table of special identifications comprise the location of the subscriber when requesting a connection.

15. The apparatus according to claim 8, further comprising an information extracting controller configured to communicate with a data base which decodes information included in the connection request and supplies the information to the first controller which is configured to check whether the connection is within a closed user group on the basis of this information.

16. The apparatus according to claim 8, wherein the apparatus is a mobile switching center.

17. The apparatus according to claim 16, wherein the table of special identifications is arranged in the mobile switching center.

* * * * *